United States Patent

[11] 3,599,814

[72] Inventor: Keith E. Brownfield
  Lansing, Mich.
[21] Appl. No. 834,028
[22] Filed June 17, 1969
[45] Patented Aug. 17, 1971
[73] Assignee The Warner & Swasey Company
  Cleveland, Ohio

[54] MATERIAL-HANDLING VEHICLE
  4 Claims, 6 Drawing Figs.
[52] U.S. Cl. ................................................ 214/141,
  180/22, 180/53, 180/66, 180/77, 180/89
[51] Int. Cl. ................................................ E02f 3/00
[50] Field of Search .......................................... 214/140,
  141, 131—138; 180/77, 79, 22, 53, 66

[56] References Cited
  UNITED STATES PATENTS
2,959,260 11/1960 Johnson et al. ............... 214/138 UX
2,783,556 3/1957 Burn et al. .................... 37/DIG. 17

FOREIGN PATENTS
234,376 9/1960 Australia ....................... 180/53 CD

Primary Examiner—Albert J. Makay
Attorney—Yount and Tarolli

ABSTRACT: An improved vehicle includes a truck mounted material-handling mechanism having a main cab or operator's station from which the vehicle is driven over a road or highway and a second cab or operator's station from which the material-handling mechanism is operated. When the vehicle is being driven over the road, power is transmitted to the driving wheels of the vehicle from a main engine by a main drive line which includes a main transmission assembly. When the material handling mechanism is being operated, a control means in the second cab or operator's station is selectively operable to drive the vehicle with power transmitted from an auxiliary engine to the main transmission assembly in the main drive line by an auxiliary drive line. The auxiliary drive line includes a pump which is driven by the auxiliary engine to provide fluid under pressure to operate a fluid motor which is drivingly connected with the main transmission assembly.

INVENTOR
KEITH BROWNFIELD

BY Yount and Tarolli
ATTORNEYS

INVENTOR
KEITH BROWNFIELD

BY Yount and Tarolli
ATTORNEYS

MATERIAL-HANDLING VEHICLE

The present invention relates generally to an improved material-handling vehicle having a main drive line and an auxiliary drive line.

A heavy-duty material-handling mechanism, such as a crane or backhoe, is frequently mounted on a truck. The truck is capable of being driven over the road or highway by operation of a main engine which is controlled from a truck cab or main operator's station. The material-handling mechanism is powered by an auxiliary engine controlled from a second or auxiliary operator's station. During operation of the material-handling mechanism it is frequently desirable to be able to move the truck forward or backward utilizing power from the auxiliary engine and to control movement of the truck from the auxiliary cab or operator's station. This is accomplished in a known material-handling vehicle by drivingly connecting the auxiliary engine to the truck drive wheels with a complicated mechanical drive mechanism. This known mechanical drive mechanism is necessarily complex since the auxiliary engine must be drivingly connected with the truck drive wheels in such a way as to enable the material-handling mechanism and the auxiliary engine to be rotated relative to the truck during operation of the material-handling mechanism.

Accordingly, it is an object of the present invention to provide a new and improved means for driving the wheels of a material-handling vehicle utilizing an auxiliary engine mounted on a movable platform and driving the vehicles wheels through a relatively simple hydraulic mechanism which incorporates a substantial part of a conventional vehicle drive line.

Another object of this invention is to provide a new and improved material-handling vehicle having a main drive line for transmitting power from a main engine and an auxiliary engine for driving a material-handling mechanism, wherein an auxiliary drive line is selectively operable to drivingly connect the auxiliary engine with the main transmission in the main drive line to thereby drive the vehicle.

Another object of this invention is to provide a new and improved material-handling vehicle which is capable of being driven from either a main operator's station which is associated with a main engine and a main drive line or an auxiliary operator's station which is associated with a material-handling mechanism and an auxiliary engine for supplying power for operating the material-handling mechanism, wherein a pump in an auxiliary drive line is operated by the auxiliary engine to provide fluid under pressure which operates a fluid motor to drive the main transmission in the main drive line to thereby enable the vehicle to be driven from the auxiliary operator's station.

These and other objects and features of the invention will become more apparent upon a consideration of the following description taken in connection with accompanying drawings wherein.

Figure 6:
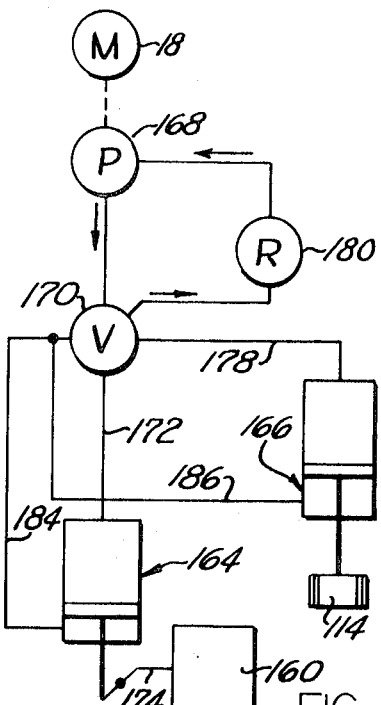

and FIG. 6 is a schematic illustration of hydraulic circuitry for contemporaneously disengaging a clutch assembly in the main drive line and engaging the power input gear in the auxiliary drive line with the transmission assembly in the main drive line.

Figure 1:
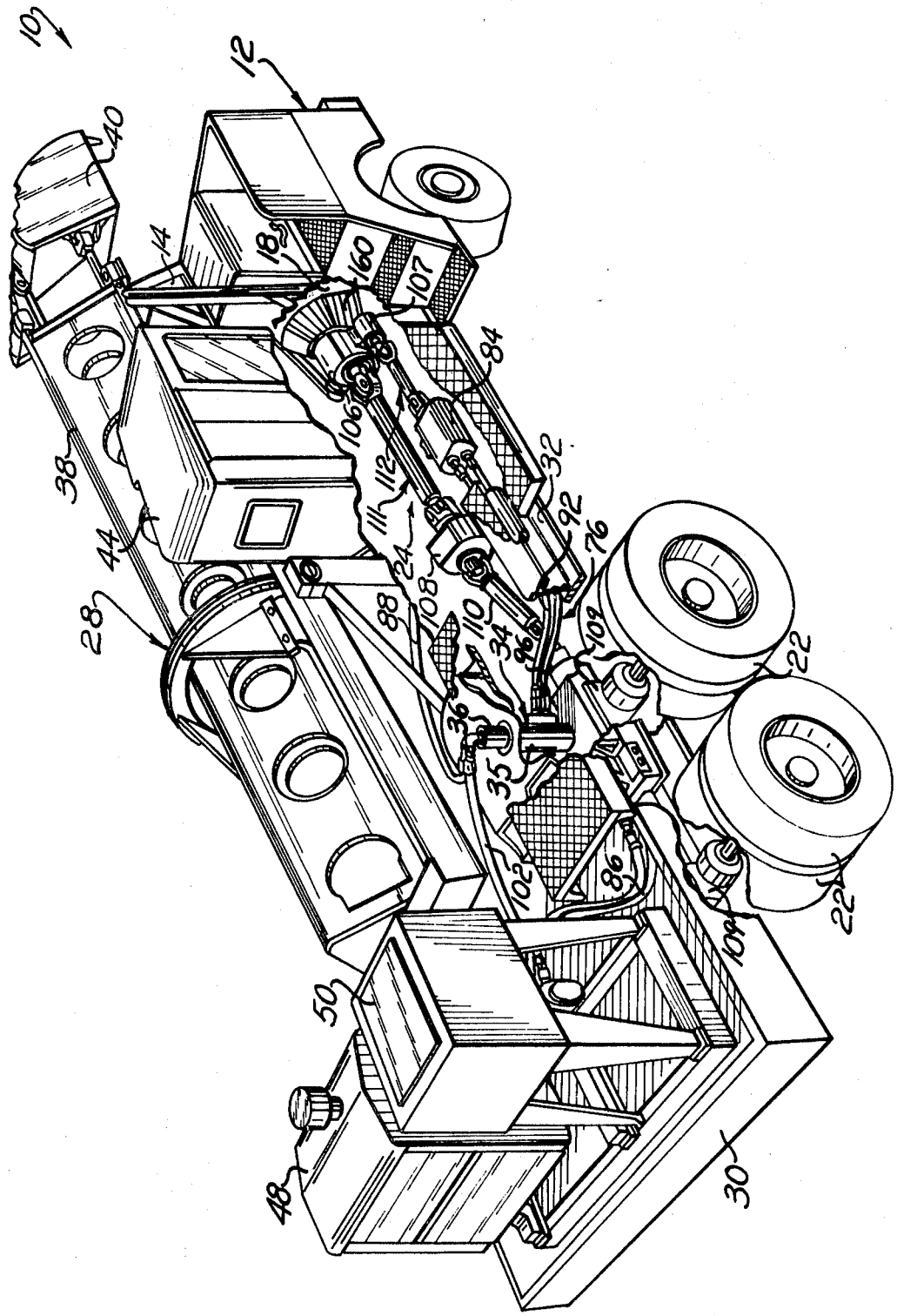
FIG. 1 is a broken away perspective view of a material-handling vehicle illustrating a specific preferred embodiment of the present invention.
Figure 2:
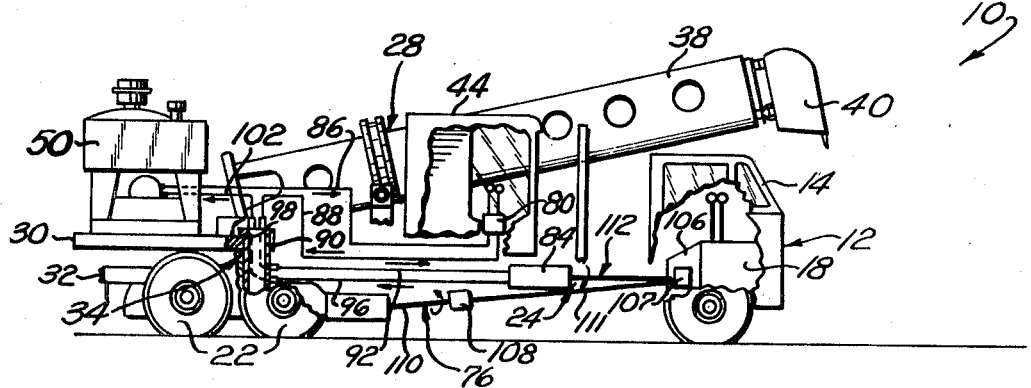
FIG. 2 is a schematic illustration of the material-handling vehicle of FIG. 1 and depicting the relationship between a main operator's cab or station, a main drive line, an auxiliary operator's cab or station, and an auxiliary drive line which is adapted to be drivingly connected to the main drive line.

Although it has been contemplated that the present invention can be used in many different types of material-handling vehicles, the invention is illustrated in FIGS. 1 and 2 in connection with a known type material-handling vehicle 10. The material-handling vehicle 10 includes a truck 12 which is driven from a main operator's cab or station 14 to drive the vehicle over the road or highway to different job sites or work locations. As the vehicle 10 is being driven over the road, power is transmitted from a main engine 18 to drive wheels 22 by a main drive line 24.

A known material-handling mechanism 28 is mounted on a platform 30 which is rotatably supported on a frame 32 of the truck 12. A center pin assembly 34 extends between the rotatable platform 30 and frame 32. The center pin assembly includes an outer casing or housing 35 (FIG. 1) which is fixedly connected to the frame 32 and a rotatable inner section or spindle 36 which is fixedly connected with the support platform 30. The material-handling mechanism 28 includes a boom assembly 38 which is extendible and retractable to move material with a suitable tool 40 mounted on the boom assembly. Operation of the material-handling mechanism 28 is controlled in a known manner from an auxiliary operator's cab or station 44 which is mounted on the rotatable platform 30 adjacent the material-handling mechanism.

Figure 3:
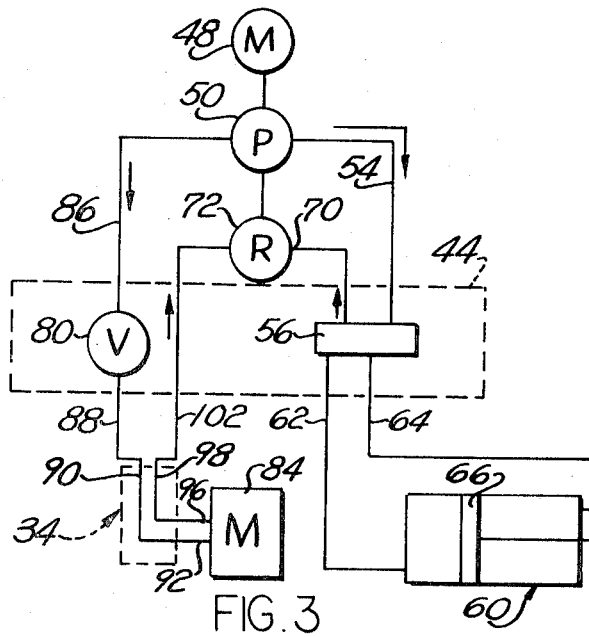
FIG. 3 is a schematic illustration of hydraulic circuitry for providing fluid under pressure to operate a material-handling mechanism and to operate a fluid motor in the auxiliary drive line.

An auxiliary engine 48 is mounted on the rotatable platform 30 and provides power for operating the material-handling mechanism 28. Accordingly, the auxiliary engine 48 is drivingly connected with a platform mounted pump assembly 50. Fluid under pressure is conducted from the pump 50 through a conduit 54 to a control valve 56 located in the auxiliary operator's cab 44 (see FIG. 3). The control valve 56 is operable to enable fluid to flow from the conduit 54 to either the head or rod end of a piston and cylinder assembly 60 through either conduits 62 or 64 to either extend or retract the boom assembly 38 in a known manner. Depending upon the direction of motion of a piston 66 of the piston and cylinder assembly 60, fluid is exhausted through one of the conduits 62 or 64 and the valve assembly 56 to a conduit 70 which is connected to a fluid reservoir 72 for supplying the pump 50.

Under certain operating conditions, an operator in the auxiliary cab 44 may want to move the vehicle 10 relative to the material being engaged by the tool 40. In accordance with the present invention, an auxiliary drive line 76 is provided to enable the operator to move the vehicle 10 without leaving the auxiliary operator's cab 44. The auxiliary drive line 76 is operable to transmit power from the auxiliary engine 48 to the main drive line 24 to thereby drive the wheels 22 and move the vehicle 10. The transmission of power by the auxiliary drive line 76 is controlled by a valve 80 (see FIGS. 2 and 3) located in the auxiliary cab 44. Suitable controls are provided in the auxiliary cab 44 to control steering and braking of the material-handling vehicle 10 when it is being driven by power transmitted to the drive wheels 22 from the auxiliary engine 48.

The auxiliary drive line 76 includes a fluid motor 84 which is fixedly mounted on the frame 32 of the truck 12. Fluid under pressure is conducted from the pump 50 to the valve 80 by fluid conduit 86. Assuming that the valve 80 has been operated to its open condition, fluid under pressure flows through a conduit 88 to a passage 90 in the center pin assembly 34. The fluid then enters a conduit 92 and flows to the fluid motor 84 to operate the fluid motor in a known manner. The fluid is exhausted from the motor 84 through a fluid conduit 96 to a passage 98 in the center pin assembly 34. The fluid then returns to the reservoir 72 through a fluid conduit 102. Since the fluid conduits 90 and 98 extend through the center pin assembly 34, the platform 30 can be rotated relative to the frame 32 about a vertical axis through the center pin assembly. Thus, power is transmitted from the auxiliary engine 48 on the rotatable platform 30 to the fluid motor 84 on the frame 32 by means of fluid conduits without using a complicated mechanical drive arrangement.

The fluid motor 84 is drivingly connected with a main transmission assembly 106 in the main drive line 24 by a power input assembly 107 (FIG. 1). The power input assembly 107 drives the main drive line 24 through the main transmission assembly 106. By actuating or shifting the main transmission assembly 106 in a known manner by means of suitable controls in the main cab 14, the drive ratio between the auxiliary engine 48 and the drive wheels 22 can be varied through a relatively large range. A secondary transmission 108 is advantageously provided in the main drive line 24 to further increase the range of available drive ratios. The secondary transmission 108 is drivingly connected with differential assemblies 109 located between the drive wheels 22 and the main transmission 106 by drive shaft assemblies 110 and 111 (FIG. 1).

Figure 4:
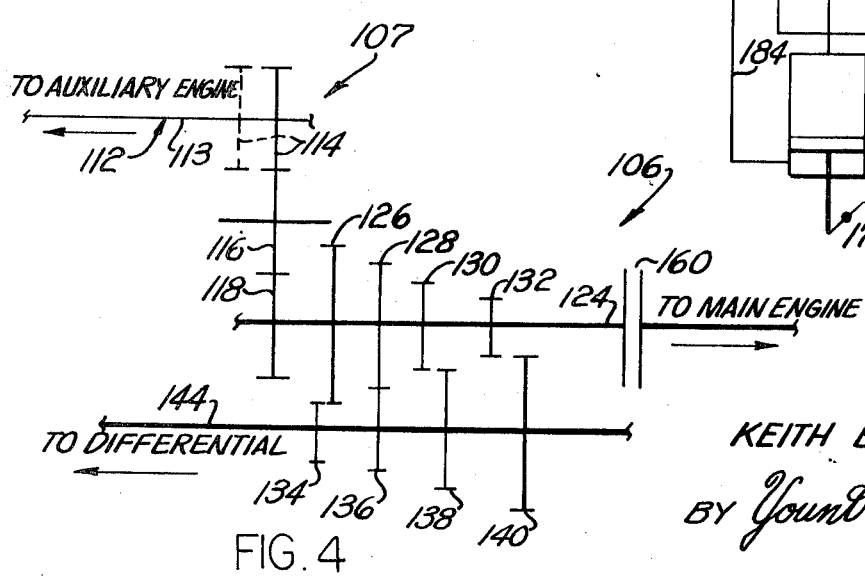
FIG. 4 is a schematic illustration depicting the relationship between a main transmission and clutch in the drive line and a power input gear in the auxiliary drive line.

The power input assembly 107 includes a drive shaft assembly 112 having a shaft 113 which is connected to an input gear 114 (see FIG. 4). The input gear 114 drives an idler gear 116 which is continuously connected in driving engagement with a gear 118 of the main transmission assembly 106. While having an opposite driving relationship, the structural relationship of the gears 114, 116 and 118 is generally similar to the gear relationship commonly utilized in a power takeoff unit.

The gear 118 is drivingly connected with a shaft 124 that drives suitable gears 126, 128, 130 and 132 which are mounted on the shaft 124 in a known manner. Depending upon the condition to which the transmission 106 is shifted or actuated, one of these gears is drivingly connected with one of the gears 134, 136, 138 and 140 which are connected to a shaft 144. The rate of rotation of the shaft 144 relative to the shaft 113 on which the input gear 114 is mounted depends upon which one of the movable gears 134 through 140 are meshed with one of the gears 126 through 132 by a shifting of the main transmission 106 in a known manner. This rotation of the shaft 144 drives the secondary transmission 108 in the main drive line 24 which in turn drives the differential gear assemblies 190 which are drivingly connected with the wheels 22 of the truck 12. Thus, many different drive ratios between the auxiliary engine 48 and the drive wheels 22 can be obtained by a shifting or adjusting of the main transmission 106 and the secondary transmission 108.

Figure 5:
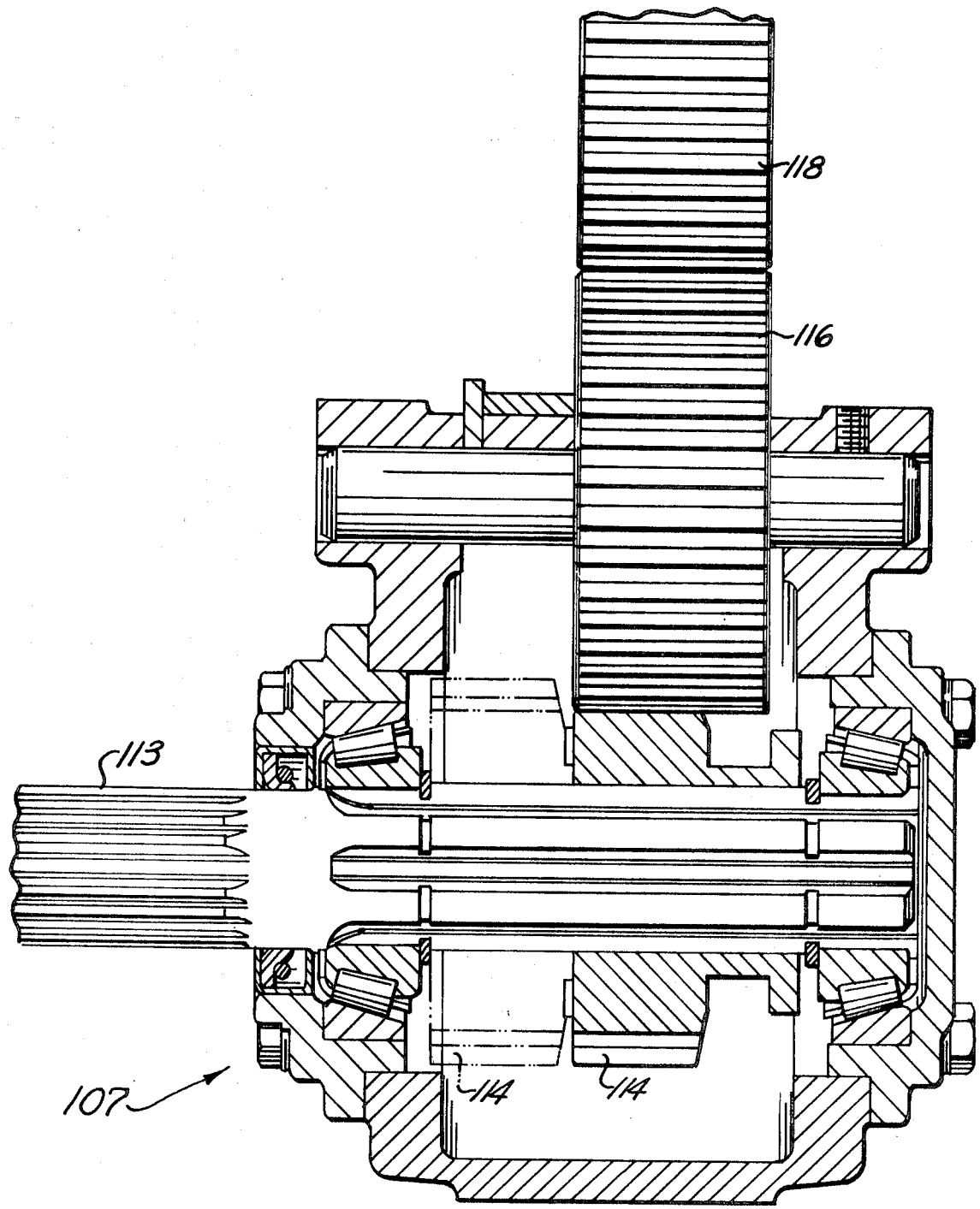
FIG. 5 is an enlarged sectional view further illustrating the relationship between the power input gear of the auxiliary drive line and the transmission assembly of the main drive line.

During operation of the material-handling mechanism 28, it is contemplated that the main engine 18 of the truck 12 will be turned off. Therefore during this operation of the material-handling handling mechanism 28, a main clutch 160 (FIGS. 1 and 4) is disengaged to prevent the inactive main engine 18 from resisting operation of the main drive line 24 when power is transmitted from the auxiliary engine 48 to the main drive line 24 by the auxiliary drive line 76. The main clutch 160 is operated to the disengaged condition contemporaneously with movement of the input gear 114 from an uncoupled or non-driving position illustrated in dashed lines in FIGS. 4 and 5 to a coupled or driving position illustrated in solid lines in FIGS. 4 and 5.

To accomplish a contemporaneous disengagement of the clutch 160 and engagement of the input gear 114 with the idler gear 116, a pair of hydraulic cylinder assemblies 164 and 166 are operated by a pump 168 upon operation of a control valve 170 in the main operator's cab 14. Operation of the control valve 170 enables fluid under pressure to flow through the conduit 172 to the head end of the piston and cylinder assembly 164 to actuate a linkage 174. Actuation of the linkage 174 operates the clutch 160 to the disengaged condition in in which the main engine is ineffective to drive the wheels 22 of the vehicle and in which the engine does not resist operation of the main drive line 24 under the influence of power transmitted thereto by the auxiliary drive line 76.

While the piston and cylinder assembly 164 is being operated, fluid is conducted to the head end of the piston or cylinder assembly 166 through a conduit 178 to move the input gear 114 from the disengaged or uncoupled position illustrated in dashed lines in FIG. 4 to the engaged or coupled condition illustrated in solid lines in FIG. 4. When the vehicle 10 is to again be operated under the influence of power transmitted to the drive wheels 22 from the main engine 18, the valve 170 is operated to connect the rod ends of the piston and cylinder assemblies 164 and 166 in fluid communication with the pump 168 through conduits 184 and 186. At the same time, the head ends of the piston and cylinder assemblies 164 and 166 are connected in fluid communication with a reservoir 180 through the conduits 172 and 178 to thereby reengage the clutch assembly 160 and move the gear 114 to the disengaged or uncoupled condition.

In view of the foregoing description, it can be seen that the material-handling vehicle 10 includes a truck 12 having a main operator's cab or station 14 from which the vehicle is driven at relatively high speeds over the road. When the vehicle 10 has reached a jobsite, the material-handling mechanism 28 is operated from the auxiliary cab or operator's station 44. To enable the vehicle 10 to be readily moved relative to material being worked on by the material-handling mechanism 28, power is transmitted from the auxiliary engine 48 to the drive wheels 22 by the auxiliary drive line 76 and the main drive line 24. The auxiliary drive line 76 is uncomplicated in structure and includes the pump assembly 50 which provides fluid under pressure for operating the fluid motor 84 which is connected to the main transmission 106 of the main drive line 24. By connecting the auxiliary drive line to the main transmission 106, the drive ratio between the auxiliary motor 48 and drive wheels 22 can be varied within a relatively large range.

Having fully described a preferred embodiment of the invention, I claim the following:

1. A material-handling vehicle comprising a frame, support surface engaging drive means connected with said frame for moving said vehicle relative to a support surface, a main engine mounted on said frame, main drive line means for transmitting power from said main engine to said support surface engaging drive means, said main drive line means including a main transmission assembly which is selectively operable to vary the drive ratio between said main engine and said support surface engaging drive means, a first operator's station mounted on said frame, first control means interconnecting said main engine and said first operator's station for enabling operator at said first operator's station to control the operation of said main engine, said first control means being actuatable to operate said main transmission assembly to vary the drive ratio between said main engine and said support surface engaging drive means, a platform movably mounted on said frame, a material-handling mechanism mounted on said platform for movement therewith relative to said frame, an auxiliary engine mounted on said platform for providing power to operate said material-handling mechanism, a second operator's station mounted on said platform, second control means operatively interconnecting said second operator's station and said material-handling mechanism for enabling an operator at said second operator's station to control the operation of said material-handling mechanism, auxiliary drive line means for operatively interconnecting said auxiliary engine and said main drive line means to transmit power from said auxiliary engine to said main drive line means to thereby effect operation of said support surface engaging drive means, and third control means for enabling an operator at said second operator's station to control the transmission of power by said auxiliary drive line means, said auxiliary drive line means comprising a fluid motor fixedly supported on said frame, coupling means for drivingly connecting said fluid motor to said main transmission assembly to enable said fluid motor to drive said support surface engaging drive means with power transmitted thereto through said main transmission assembly and to enable the drive ratio between said auxiliary engine and said support surface engaging drive means to be varied by operation of said main transmission assembly, pump means mounted on said platform and operatively connected to said auxiliary engine for supplying fluid under pressure, and fluid conduit means for conducting fluid under pressure from said pump means on said platform to said fluid motor on said frame to operate said fluid motor to effect operation of said main transmission assembly and said support surface engaging drive means to move said vehicle under the control of an operator at said second operator's station.

2. A material-handling vehicle as set forth in claim 1 wherein said coupling means is selectively operable to a first condition to operatively connect said auxiliary drive line means to said main transmission assembly and to a second condition to operatively disconnect said auxiliary drive line means from said main transmission assembly, said main drive line means including clutch means which is selectively operable between an engaged condition in which said main transmission assembly is operatively connected to said main engine and a disengaged condition in which said main transmission assembly is operatively disconnected from said main engine, and actuator means for operating said coupling means to said first condition and contemporaneously therewith operating said clutch means to said disengaged condition to thereby enable said auxiliary engine to drive said main transmission assembly with said main engine operatively disconnected from said main transmission assembly, said actuator means also being operable to operate said coupling means to operate said coupling means to said second condition and to contemporaneously therewith operate said clutch means to said engaged condition to thereby enable said main engine to drive said main transmission assembly with said auxiliary engine disconnected from said main transmission assembly.

3. A material-handling vehicle as set forth in claim 1 wherein said transmission assembly includes a plurality of gears and said coupling means includes a gear which is selectively movable into and out of engagement with one of the gears of said transmission assembly.

4. A material-handling vehicle as set forth in claim 1 further comprising post means for rotatably connecting said platform with said frame, said fluid conduit means extending from said pump means on said platform through said post means to said fluid motor on said frame to thereby connect said pump means in fluid communication with said fluid motor while enabling said platform to rotate relative to said frame.